United States Patent
Perea et al.

[11] Patent Number: 6,039,338
[45] Date of Patent: Mar. 21, 2000

[54] SOUND GENERATING DEVICE FOR SPOKED WHEEL

[76] Inventors: Larry Perea; Kim Perea, both of 1118 Ridgegate Ct., Antioch, Calif. 94509

[21] Appl. No.: 08/956,381

[22] Filed: Oct. 23, 1997

[51] Int. Cl.[7] .................................................. B62H 1/00
[52] U.S. Cl. ..................................... 280/288.4; 280/292
[58] Field of Search ............................ 280/288.4, 292; 446/404; 248/689, 741; 403/344

[56] References Cited

U.S. PATENT DOCUMENTS

| | | | |
|---|---|---|---|
| 578,027 | 3/1897 | Rogers | 280/288.4 |
| 1,330,355 | 2/1920 | Spery | 403/344 |
| 1,362,244 | 12/1920 | Farley | 403/344 |
| 1,542,706 | 6/1925 | Lang | 248/689 |
| 2,138,812 | 12/1938 | Akers et al. | 248/689 |
| 2,434,440 | 1/1948 | Schafranek | 248/689 |
| 2,596,133 | 5/1952 | Donahue et al. | 248/689 |
| 2,624,156 | 1/1953 | Meyer | 446/404 |
| 2,633,097 | 3/1953 | Frew . | |
| 2,667,720 | 2/1954 | Connell | 446/404 |
| 2,719,385 | 10/1955 | Wilson | 446/404 |
| 2,721,421 | 10/1955 | Steele | 446/404 |
| 2,748,532 | 6/1956 | Gergovich et al. . | |
| 2,752,207 | 6/1956 | Young | 403/344 |
| 2,874,514 | 2/1959 | Munro . | |
| 2,894,357 | 7/1959 | Munro . | |
| 2,940,215 | 6/1960 | Munro . | |
| 3,097,447 | 7/1963 | Peham et al. | 446/404 |
| 4,018,450 | 4/1977 | Rutledge . | |
| 4,483,586 | 11/1984 | Sisto | 280/289 |
| 4,908,000 | 3/1990 | Counts | 280/288.4 |
| 4,991,993 | 2/1991 | Watlington et al. | 403/344 |
| 5,226,846 | 7/1993 | Onori | 446/404 |
| 5,611,558 | 3/1997 | Randmae | 280/288.4 |

Primary Examiner—J. J. Swann
Assistant Examiner—Michael Cuff
Attorney, Agent, or Firm—Theodore J. Bielen, Jr.

[57] ABSTRACT

A sound generating device for a spoked wheel utilizing a base member having a clamp. Base member is provided with a slot that extends outwardly from the clamp. A flange element may be anchored in the slot and extend from the slot in the form of a flap. The flap is intended to contact the spoked wheel when it turns.

5 Claims, 2 Drawing Sheets

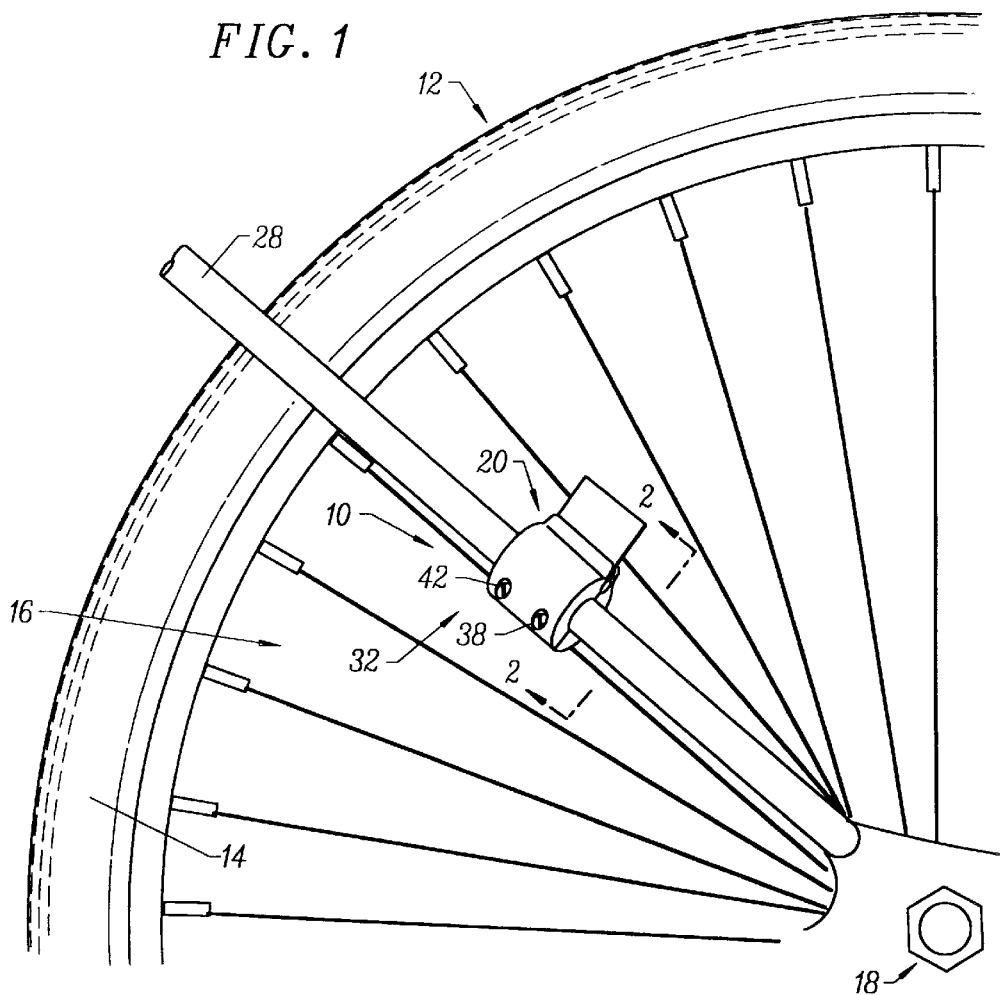
FIG. 1
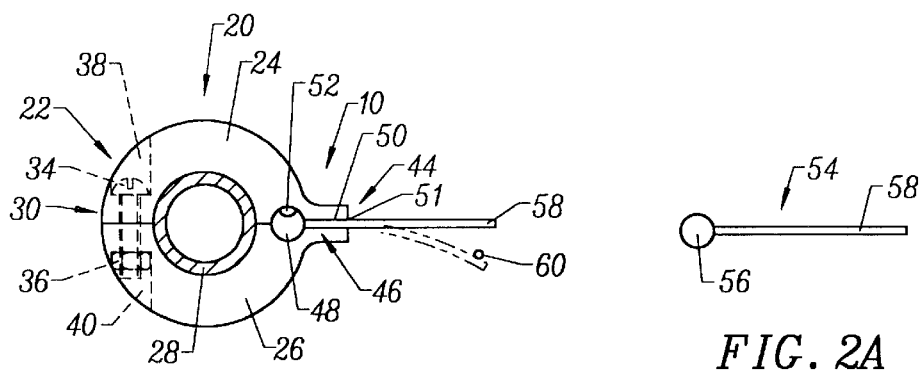
FIG. 2
FIG. 2A

SOUND GENERATING DEVICE FOR SPOKED WHEEL

BACKGROUND OF THE INVENTION

The present invention relates to a novel and useful sound generating device for a spoked wheel.

Spoked vehicles such as bicycles are most commonly used by children. Such bicycles are decorated with accessories befitting the whimsy of the child. For example, bicycles have been adorned with streamers, horns, pin wheels, and the like. Moreover, playing cards have been attached to the frame of the bike by a clothes pin or other clip such that the playing card repeatedly strikes the spokes of the wheel when it turns. This rapidly beating noise is most delightful to children.

In the past, similar noise making attachments have been devised for bicycles and other spoked wheel vehicles. U.S. Pat. No. 2,748,532 shows the attachment of an elastic balloon like member to a spoked wheel in order to produce a bubbling type sound similar to that of an internal combustion engine.

U.S. Pat. Nos. 2,633,097, 2,874,514, 2,894,357, and 2,940,215 describe noise making devices for bicycles which include a strip of material that is fixed to the frame of the bike by brackets, adhesive strips, or by tabs that are bent. Such attachment structures are elaborate and flimsy, at best.

U.S. Pat. No. 4,018,450 shows a brace which is fixed to the frame of the bike and attaches a noise making strip. The vibration is generated by the strip and transmitted to the tubular member. The degree of looseness in the tube adjusts the amount of vibration which is generated.

A sound generating device for a spoked wheel which permits the use of interchangeable strips and is durable would be a notable advance in the toy industry.

SUMMARY OF THE INVENTION

In accordance with the present invention a novel and useful sound generating device is herein provided.

The device of the present invention utilizes a base member which includes a clamp to allow attachment of the base member to a portion of the vehicle such as the frame of the bicycle. The base member may be formed into two parts and include a fastener to hold the parts together. The base member also is provided with a open slot leading to the interior of the same. The slot may be formed with a large portion and a small portion that communicates with the exterior of the base member. The slot may also be formed with a stop, essentially blocking an entrance to the slot from the outer portion of the base member. The stop may simply take the form of a protuberance which extends from the relatively large section of the slot at a selected place along the relatively large section of the slot. The base member is constructed of a material to form a rigid or a resilient member.

A flange element is also found in the present invention. Flange element is formed with an anchor portion and a flap portion connected to the anchor portion. The anchor portion fits within and is held by the slot. Specifically the anchor portion is sized to extend through the large section of the slot. The flap portion of the flange element is resilient and is capable of striking a spoke of the wheel of the vehicle. When the wheel turns, such striking generates a rapping sound on successive spokes. The open slot permits the flap element to extend outwardly from the base member when the base member is held to a portion of the vehicle by the clamp.

It may be apparent that a novel and useful sound generating device for a spoked wheel has been described.

It is therefore an object of the present invention to provide a sound generating device for a spoked wheel which produces a motor-like sound which is pleasing to children.

Another object of the present invention is to provide a sound generating device for a spoked wheel which is durable and may be essentially permanently fixed to the vehicle.

A further object of the present invention is to provide a sound generating device for a spoked wheel in which flexible flange elements are usable to strike the spokes of the wheel, such flexible flange elements being interchangeable.

Another object of the present invention is to provide a sound generating device for a spoked wheel which utilizes flange elements that strike the spokes of the wheel and are of different sizes, shapes, and colors.

The invention possesses other objects and advantages especially as concerns particular characteristics and features thereof which will become apparent as the specification continues.

BRIEF DESCRIPTION OF THE DRAWINGS

FIG. 1 is a side elevational view of a portion of a spoked wheel and the device in place thereupon.

FIG. 2 is a sectional view taken along line 2—2 of FIG. 1.

FIG. 2A is a side elevational view of the flange element of the present invention.

Figure 3:
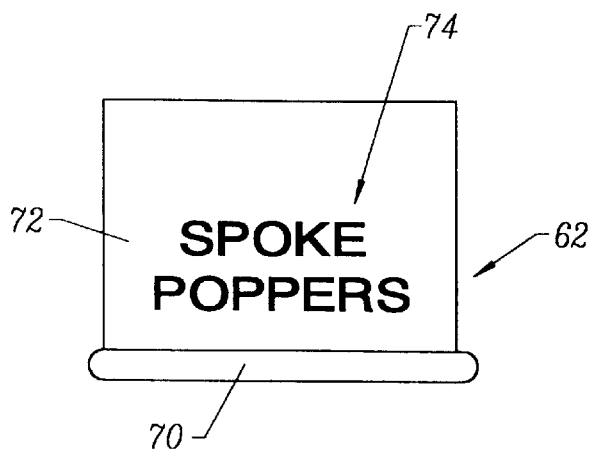
FIG. 3 is a top plan view of a first embodiment of flange element.

For a better understanding of the invention references made to the following detailed description of the preferred embodiments thereof which should be taken in conjunction with the prior described drawings.

DETAILED DESCRIPTION OF THE PREFERRED EMBODIMENTS

Various aspects of the present invention will evolve from the following detailed description of the preferred embodiments which should be referenced to the noted drawings.

The invention as a whole is shown in the drawings by reference character 10. Device 10 is used in conjunction with a spoked wheel 12 having a tire portion 14 and a plurality of spokes 16. Axis nut 18 serves as the central place of rotation of wheel 12.

With reference to FIG. 10, it may be observed that base member 20 of device 10 is provided. Base member 10 includes a clamp 22 which is formed by two roughly semi-cylindrical parts 24 and 26. Such parts may be constructed of a rigid semi-rigid or resilient material, as desired. Clamp 22 is intended to hold base member 20 to frame strut 28 which is part of a bicycle, in the embodiment depicted in FIG. 1. That is to say, parts 24 and 26 fit over strut 28 in a snug manner. Fastening means 30 holds parts 24 and 26 together around strut 28 without slippage. Fastening means 30 may take the form of a pair of screws and cooperating nuts 32, FIG. 1. With reference to FIG. 2, it may be observed that screws 34 and 36 are depicted within recesses 38 and 40 on parts 24 and 26 respectively. There are four such recesses on base member 20, recesses 38 and 42 being depicted on FIG. 1.

Parts 24 and 26 of base member 20 also terminate in an edge portion 44 when brought together. Edge portion partially encompasses a slot 46 having a large section 48 and a small section 50 which communicates with large section 48. Small section 50 of slot 46 is opened at the end surface 51 of edge portion 44 of base member 20. A stop 52, in the form of a tab extending from part 24 of base member 20 within slot 46, is also included.

Flange element 54, FIG. 2A may also be found in the present invention. Flange element is constructed with a first anchor portion 56, which is a generally a cylindrical member. Second flap portion 58 extends from anchor portion 56. Flap portion 58 is resilient and is capable of striking any of plurality of spokes 16 while wheel 12 turns. For example, spoke 60 is shown in FIG. 2 as being in contact with flap 58 of flange element 54. Cylindrical portion 56 of flap element 54 is intended to fit within large section 48 of slot 46 and be held within slot 46 by stop 52.

Figure 4:
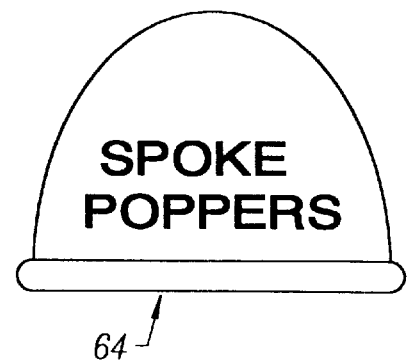
FIG. 4 is a top plan view of a second embodiment of a flange element.
Figure 5:
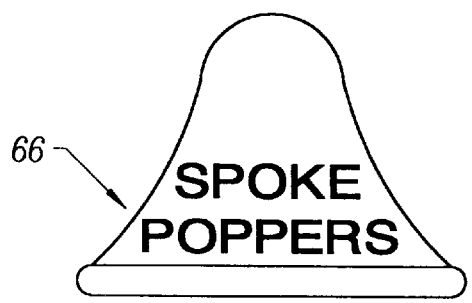
FIG. 5 is a top plan view of a third embodiment of a flange element.
Figure 6:
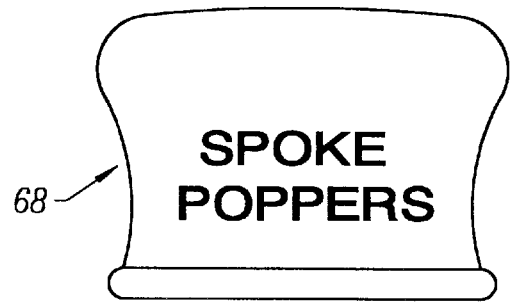
FIG. 6 is a top plan view of a fourth embodiment of a flange element.

Turning to FIGS. 3–6, other embodiments 62, 64, 66, and 68 of flange element 54 are shown. Each embodiment 62–68 includes an anchor portion and a flap portion, similar to flange element 54. For example, flange element 62 possesses an anchor portion 70 and a flap portion 72 having the same characteristics as anchor portion 56 and flap portion 58 of flange element 54. However, the shape of a flap portions of embodiment 62–68 vary. In addition, indicia may be placed on any of the flap portions of flange elements 62–68, as depicted in FIGS. 3–6.

In operation, the user attaches device 10 to frame strut 28 or any similar structural member of a vehicle such as a bicycle. In this regard, clamp 22 is employed by fastening parts 24 and 26 together around strut 28. Fastening means 30 is then used to hold base member 20 tightly on strut 28. It should be noted that slot 46 is open at this time due to communication of small section 50, with at edge surface 51 of edge portion 44. Edge portion 44 may possess a slight resiliency, depending on the type of material chosen for the construction of base member 20. At this point, many of the flange elements 54, 62, 64, 66, or 68 may be slipped into slot 46 and rest against stop 52 therein. Consequently, any flap portions extending from base members 20 and 62–68 and are all capable of striking any one of the plurality of spokes 16 to produce a noise. For example, on FIG. 2, flap portion 58 is shown striking spoke 60. Each strike of a spoke produces a rapping noise such that when wheel 12 turns successive rapping sounds are generated. It may be observed that flange elements may be of any base members 20 and 62–68 maybe interchanged dependent on the predilection of the user. Such interchangability is accomplished simply by slipping a flange element out of slot 46 in the direction opposite to entry therewithin.

While in the foregoing, embodiments of the present invention have been set forth in considerable detail for the purposes of making a complete disclosure of the invention, it may be apparent to those of skill in the art that numerous changes may be made in such details without departing from the spirit and principles of the invention.

What is claimed is:

1. A sound generating device for a spoked wheel on a vehicle, comprising:
   a. a base member, said base member including a clamp for attachment to a portion of the vehicle in the vicinity of the wheel, said base member including a slot therethrough apart from said clamp, said slot in said base member including a large section and a narrow section, said narrow portion of said slot terminating in a mouth communicating with the exterior of said base member; and
   b. a flange element, said flange element including a first elongated anchor portion connected to a second flap portion, said first elongated anchor portion sliding within and held by said slot, said second flap portion of said flange element extending outwardly from said narrow portion of said slot, said second flap portion being resilient and capable of striking the spoked wheel.

2. The device of claim 1 which additionally comprises a stop connected to said base for restricting sliding movement of said anchor portion in said slot.

3. The device of claim 1 in which said stop comprises a tab at said relatively large portion of said slot.

4. The device of claim 1 in which said clamp comprises said base member being formed into a first part, a second part, and fastening means for connecting said first and second parts.

5. The device of claim 4 which additionally comprises a stop for restricting movement of said anchor portion in said slot.

* * * * *